Patented Oct. 18, 1927.

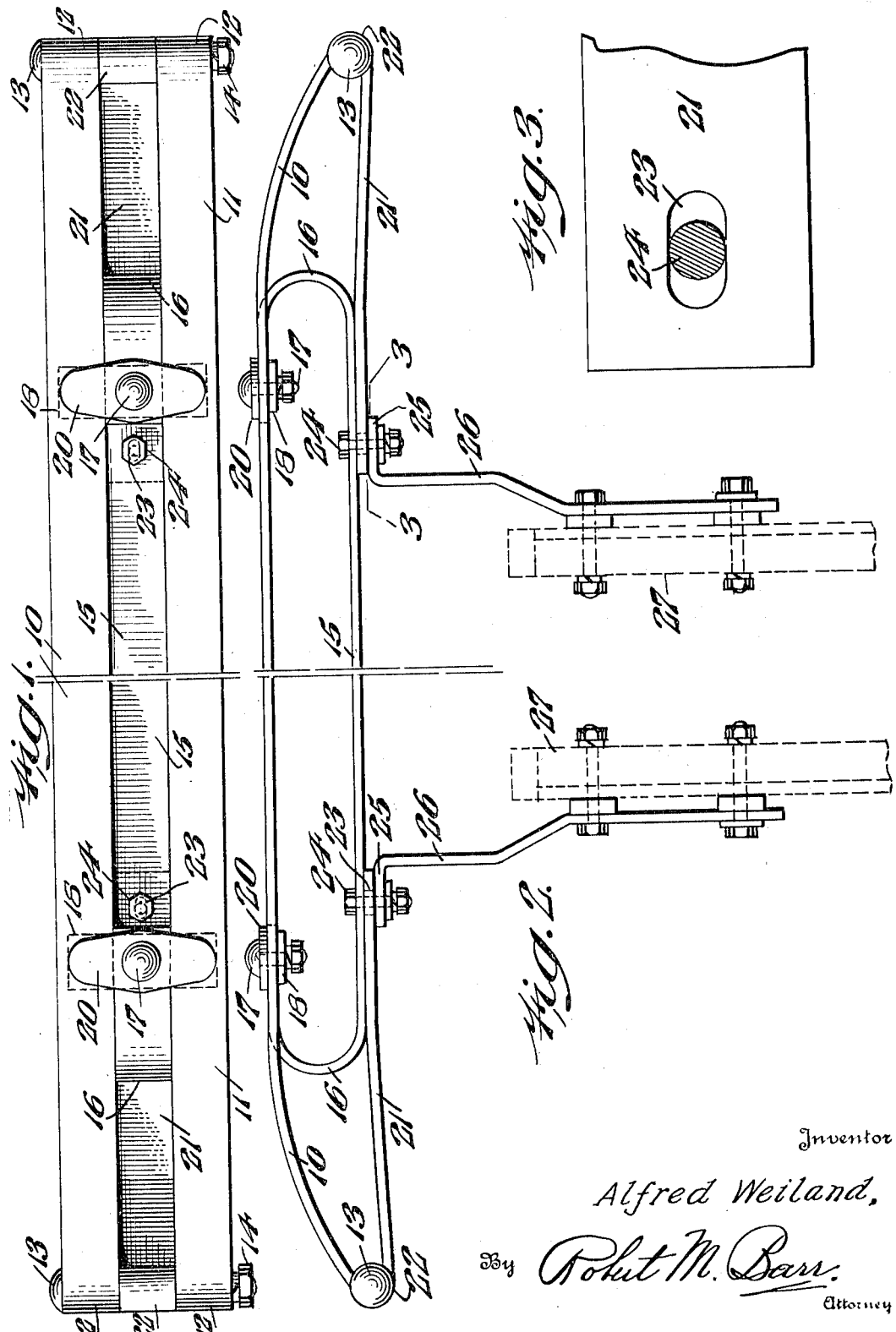

1,645,561

UNITED STATES PATENT OFFICE.

ALFRED WEILAND, OF NESHANIC, NEW JERSEY. ASSIGNOR TO SHELDON AXLE AND SPRING COMPANY, OF WILKES-BARRE, PENNSYLVANIA, A CORPORATION OF PENNSYLVANIA.

VEHICLE BUMPER.

Application filed February 27, 1926. Serial No. 91,105.

The present invention relates to bumpers for automobiles and more particularly to a flexible spring bar impact receiving construction.

Some of the objects of the present invention are to provide an improved unitary bumper structure; to provide an improved bumper wherein impact members are arranged to absorb shocks of a minor character while major shocks are absorbed by certain spring adjuncts of the bumper in cooperation with the impact members; to provide means to relieve certain parts of a bumper of the shock of impact and lessen such impact before transmitting it to other parts of the bumper; to provide means for preventing the rearwardly curved ends of the impact member or members from becoming entangled with or caught upon obstructions when the vehicle, to which the bumper is attached, is backed or otherwise maneuvered in a path or paths out of its ordinary forward direction of travel; to provide slip joint connection between certain parts of the bumper whereby lateral impacts are received upon an initially non-rigid structure; and to provide other improvements as will hereinafter appear.

In the accompanying drawings, Fig. 1 represents a front elevation of a bumper embodying one form of the present invention; Fig. 2 represents a plan of the same; and Fig. 3 represents a section on line 3—3 of Fig. 2.

Referring to the drawings, one form of the present invention consists of two impact bars 10 and 11 preferably formed of flat spring steel and arranged in parallel edge to edge relation, one superposed with respect to the other and suitably spaced therefrom. The two ends of the respective bars 10 and 11 are similarly curved rearwardly with respect to the direction of travel of the bumper and terminate in eyes 12 for the reception of pivot bolts 13 and nuts 14 or other means which can serve to connect the extremities of the bars while permitting relative turning of the eyes 12 upon the bolts 13.

For the purpose of absorbing shocks received by the impact bars 10 and 11 and for re-enforcing the action of such bars, there is an intermediate rearwardly located shock resisting bar 15 which extends parallel to the aforesaid impact bars 10 and 11 and across substantially the main central impact receiving portion of the bumper. As here shown this bar 15 is located rearwardly opposite the space between the two impact bars 10 and 11 and its two ends are respectively forwardly and reversely curved as shown at 16 to enter and terminate in the space between the bars 10 and 11 and in the vertical plane of these bars. These end bars 16 are apertured respectively to receive bolts 17 which traverse inner and outer clamping places 18 and 20 so that when the aforesaid bolts 17 are tightened, the ends of the bar 15 will be rigidly clamped to the impact bars 10 and 11.

As a means for taking up the deflection of the ends of the bars 10 and 11 under received impacts, re-enforcing their shock absorbing action and preventing bending of such ends under abnormal stress, two bridge bars 21 are provided, each having an eye 22 to receive one of the bolts 13 and the length of such eyes being such as to seat snugly between the ends of the bars 10 and 11 when the parts are in assembled condition. The opposite ends of these bars 21 are respectively provided with slots 23 for the reception of fastening bolts 24 which also pass through the bar 15 and through laterally turned ends 25 of supporting brackets 26. These brackets are made fast by any suitable means to the side frames 27 of the vehicle to which the bumper is to be attached. It will thus be seen that the bars 21 respectively bridge the spaces between the ends of the bar 15 and the bolts 13 and while serving as thrust members resisting lateral inward movement of the ends of the impact members also serve as barriers to prevent objects from being engaged by the rear faces of the ends of the impact bars 10 and 11. Attention is directed to the lost motion connection between these bars 21 and the adjacent parts since this provides for lessening of the initial heavy impact of a laterally directed blow. In other words, an excessive thrust transmitted to the bars 21 will not be received directly by the bar 15 or the supports 26 because the relative movement or the slip connection is sufficient to so diminish the thrust as to make it negligible even though the impact be heavy enough to cause the bar 21 to take up substantially all of its lost motion.

From the foregoing it will be apparent that a complete unitary bumper construction has been devised wherein all ordinary shocks and impacts of a minor nature are received by the impact bars 10 and 11 which, due to their inherent spring properties, absorb such shocks without transmission to the vehicle frame. Where received shocks are greater than ordinarily met, the flexing of the bars 10 and 11 is transmitted to the bar 15 and by reason of its curved end structure, there is a proportioning of the shock and an added gradual absorption thereof before it reaches the vehicle frame. Since the bar 15 extends transversely across the central major portion of the bumper substantially all impacts received by the bumper in its usual forward direction of travel are met and absorbed. Where the direction of impact comes angularly from the side or is received endwise upon the bumper ends, there is a flexing of the rearwardly curved ends 10 and 11 of the bumper to absorb and counteract this lateral force and the resistance thereto is substantially augmented by the thrust resisting qualities of the bridge bars 21. In view of the fact that these bridge bars are free to move to a limited extent under such side thrusts, there is no direct rigid transmission to the bumper or its supports.

Having thus described my invention, I claim:

1. A bumper comprising impact bars arranged in spaced superposed edge to edge relation and having rearwardly curved end portions, a re-enforcing bar spaced rearwardly from said impact bars substantially parallel to the body portion of said impact bars and having forwardly and reversely curved ends terminating between said impact bars, clamping means for uniting said ends with said impact bars, means for supporting said re-enforcing bar from a vehicle frame, and means interposed between said supporting means and each end portion of said impact bars to protect the rear side of said curved end portions and to assist in the absorption of impact, said interposed means being arranged to have a limited movement under impact before transmitting said impact to said supporting means.

2. A bumper comprising impact bars having rearwardly curved ends, devices connecting adjacent ends together, a reenforcing bar spaced rearwardly from said impact bars and having reversely curved ends connected to said impact bars, means for supporting said re-enforcing bar from the frame of a vehicle, lateral thrust receiving members interposed respectively between said connecting devices and said supporting means, and a lost motion connection between each thrust receiving member and said supporting means.

3. A bumper comprising impact bars having rearwardly curved ends terminating in eyes respectively, pivot bolts connecting adjacent eyes, a re-enforcing bar spaced rearwardly from said impact bars and having reversely curved ends connected to said impact bars, means for supporting said re-enforcing bar from the frame of a vehicle, and lateral thrust receiving members interposed respectively between said pivot bolts and said supporting means, said members being pivoted to said bolts respectively and having lost motion connections respectively with said supporting means.

4. A bumper comprising impact bars having rearwardly curved ends terminating in eyes respectively, pivot bolts connecting adjacent eyes, a re-enforcing bar spaced rearwardly from said impact bars and having yielding connection with said impact bars, means for supporting said re-enforcing bar from the frame of a vehicle, and lateral thrust receiving members interposed respectively between said pivot bolts and said supporting means, said members having lost motion connections respectively with said supporting means.

5. A bumper comprising impact bars having rearwardly curved ends, supporting bars attached to the frame of a vehicle, shock absorbing means connected between said impact bars and said supporting bars, and rigid non-spring bars connected respectively between said supporting bars and the ends of said impact bars.

Signed at Philadelphia, county of Philadelphia, State of Pennsylvania, this 17th day of February, 1926.

ALFRED WEILAND.